United States Patent
Fultz

(10) Patent No.: US 10,039,173 B2
(45) Date of Patent: Jul. 31, 2018

(54) BUILDING LINE POWER ADAPTER AND A DEVICE INCORPORATING THE SAME

(71) Applicant: ABL IP HOLDING LLC, Conyers, GA (US)

(72) Inventor: Tyler B. Fultz, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 37 days.

(21) Appl. No.: 15/208,848

(22) Filed: Jul. 13, 2016

(65) Prior Publication Data

US 2018/0020531 A1    Jan. 18, 2018

(51) Int. Cl.
| | |
|---|---|
| *H05B 37/02* | (2006.01) |
| *H05K 5/00* | (2006.01) |
| *H02M 7/00* | (2006.01) |
| *H05B 33/08* | (2006.01) |

(52) U.S. Cl.
CPC ........ *H05B 37/0272* (2013.01); *H02M 7/003* (2013.01); *H05B 33/0854* (2013.01); *H05B 37/0218* (2013.01); *H05B 37/0227* (2013.01); *H05K 5/0017* (2013.01)

(58) Field of Classification Search
CPC .................................. G06F 1/16; H05B 33/08
USPC ......................................................... 710/303
See application file for complete search history.

(56) References Cited

U.S. PATENT DOCUMENTS

| | | | |
|---|---|---|---|
| 3,778,634 A | 12/1973 | Hanrihan | |
| 5,243,269 A | 9/1993 | Katayama et al. | |
| 6,566,843 B2 | 5/2003 | Takano et al. | |
| 2007/0090796 A1 | 4/2007 | Norris | |
| 2008/0174270 A1* | 7/2008 | Serna | G06F 1/1632 320/111 |
| 2009/0309689 A1* | 12/2009 | Pavlovic | H01H 85/153 337/187 |
| 2011/0076551 A1* | 3/2011 | Nagaoka | H01M 2/1022 429/179 |
| 2011/0121782 A1 | 5/2011 | Marsh et al. | |
| 2014/0244882 A1* | 8/2014 | Struthers | H04H 20/63 710/303 |
| 2014/0268600 A1* | 9/2014 | Khoury | H05K 1/111 361/752 |
| 2015/0039042 A1* | 2/2015 | Amsler | A61N 1/3925 607/7 |
| 2015/0156840 A1* | 6/2015 | Wiscombe | H05B 33/0854 315/153 |

(Continued)

*Primary Examiner* — Timothy Thompson
*Assistant Examiner* — Charles Pizzuto
(74) *Attorney, Agent, or Firm* — RatnerPrestia

(57) ABSTRACT

Disclosed are examples of a device that is mountable on a surface of an occupiable space in a building. The device may include an input interface plate that protrudes from the surface into the occupiable space of the building, while a portion of the device remains within the interior space of the building's surface. The device enables wireless control of a remote device, such as a luminaire, outlet or the like. The device is convertible between being powered by a stand-alone power source, such as a battery, and being powered by a power module that connects to the building's alternating current electrical power supply. The power module is configured to connect to the building's alternating current electrical power supply, convert the provided electrical power to a direct current electrical power appropriate for use by the device.

18 Claims, 4 Drawing Sheets

(56) References Cited

U.S. PATENT DOCUMENTS

2016/0379782 A1\* 12/2016 Lee ........................... H02J 4/00
                    307/140
2017/0229010 A1\* 8/2017 Camden ................. G08C 17/02

\* cited by examiner

BUILDING LINE POWER ADAPTER AND A DEVICE INCORPORATING THE SAME

BACKGROUND

Conventional wall switches control light fixtures or electrical outlets for lamps over wired systems. The conventional wall switches are connected to a building's electrical power via electrical wiring and operate to connect or disconnect the electrical power to the conventional luminaire by switching electrical power ON or OFF.

More recent lighting systems are controlled wirelessly. For example, a light fixture or a connected power supply may receive an ON/OFF command over-the-air in response to activation of a wall switch that communicates the ON/OFF command wirelessly directly or indirectly to the power supply device that applies electrical power to the light source in the fixture. A wireless control switch may include battery power for the wireless transmitter and any other electronics of wireless wall switch. A benefit of the wireless, battery powered wall switches is that the switch can be placed at nearly any location that allows wireless communication without connecting to the building's electrical power supply or other wiring.

However, when a battery powered wireless wall switch is replacing a conventional line powered/connected wall switch, it may sometimes be beneficial to utilize the building's existing electrical wiring at the conventional wall switch location as a power source instead of the battery used as the wireless wall switch's power source to insure the power supply does not degrade (e.g., diminish) over time. For example, stand-alone power sources degrade over time and may not provide the electrical power required for operation of the device control circuit and/or radio transceiver. Since wall switches exist as either battery powered or building electrical powered (i.e., line powered), a plan must be devised before installing a large number of devices at a commercial or retail facility in order to purchase a correct number of line powered wireless devices and a correct number of battery powered wireless devices.

Attempts have been made in other types of battery powered devices, such as power tools and the like to replace a battery power supply with a power supply having an electrical cord that allows an electronic device to be powered from an electrical outlet. In addition, charging circuits that charge the battery power source while allowing the battery power source to supply power to the device are also known. However, none of these attempts have addressed the need for reusing existing electrical wiring within a building's wall as an a replacement power source for a wireless electrical control device installed within the wall.

Accordingly, a system or device is needed to overcome these and other limitations in the art. The provided system or device would facilitate easy reuse of the existing electrical wiring in the building to power an otherwise wireless wall switch or the like and reduce the number of batteries that had to be purchased or maintained in inventory.

SUMMARY

Disclosed is an example of a device that includes a housing, an input interface place, a control logic circuit, a power supply compartment, power supply terminals, and a power module. The housing is configured to be mounted on a surface of an occupiable space in a building. The input interface plate is coupled to the housing. The control logic circuit is within the housing, and is responsive to an input via the interface panel and has a predetermined electrical power supply requirement. The power supply compartment is within the housing and has an interior space shaped to accept a removable stand-alone power source. The removable stand-alone power source has a first form factor, and the interior space is configured to secure the removable stand-alone power source within the power supply compartment. The power supply terminals are accessible at the interior space of the power supply compartment, and are configured to mate with power output contacts of the removable power source to deliver direct current electrical power to the control logic circuit. The power module has a second form factor that replicates the first form factor of the removable stand-alone power source. The power module is configured to fit in the interior space of the power supply compartment when the removable power supply is removed. The power module includes connection points for coupling to a building's electrical power supply wiring; an electrical power conversion circuit configured to convert the building electrical power received via the connection points to the predetermined electrical power supply requirement of the control logic circuit; and power module contacts configured to electrically couple an output from the electrical power conversion circuit to the power supply terminals, to deliver the electrical power meeting the predetermined electrical power supply requirement to the control logic circuit.

Disclosed is another example of a device including a control device housing, an input interface plate, and a removable power module. The control device housing is configured to be mounted on a surface of an occupiable building space, the control device housing including a control circuit, a power supply compartment, power supply terminals, and an input interface plate. The control circuit is responsive to an input. The power supply compartment has a shape that conforms to a shape of a stand-alone power source. The power supply terminals are positioned within the power supply compartment and coupled to the control circuit. The input interface plate is coupled to the control device housing. The removable power module is shaped to replicate the shape of the stand-alone power source, and is configured for insertion into and removal from the power supply compartment. The removable power module includes connection points that couple directly to a building's alternating current electrical power supply on the surface of the occupiable building space; an electrical power conversion circuit to convert the building electrical power to the direct current electrical power; and power delivery terminals that mate with the power supply terminals positioned within the power supply compartment to deliver the direct current electrical power to the control circuit.

Disclosed is yet another example of a device that includes a power module housing, connection points, an electrical power conversion circuit and power module contacts. The power module housing insertable into a power supply compartment of a control device mountable through a surface of an occupiable space. The connection points are electrically connectable to wiring on the surface. The electrical power conversion circuit disposed within the power module housing and electrically coupled to the connection points, and is configured to convert alternating current electrical power received via the connection points to a predetermined direct current electrical power. The power module contacts to deliver the direct current electrical power to devices electrically couple to the power supply terminals to deliver the electrical power meeting the predetermined electrical power supply requirement of the control logic circuits. The power module housing is configured to replicate a form factor of the power supply compartment that accepts removable stand-alone power sources, and fit in the interior space of a power supply compartment.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It would be beneficial to provide an adapter that converts a battery-powered device into a line-powered electronic device in order for the same device to be used in applications that require battery and line powered devices without prior knowledge of the installation environment. Use of the line powered adapter should be as easy and convenient as possible, e.g. with minimalist structural modification of the wall mounted electronic device other than (or in addition to) replacing the battery power source with the line powered adapter.

Reference now is made in detail to the examples illustrated in the accompanying drawings and discussed below.

Figure 1:
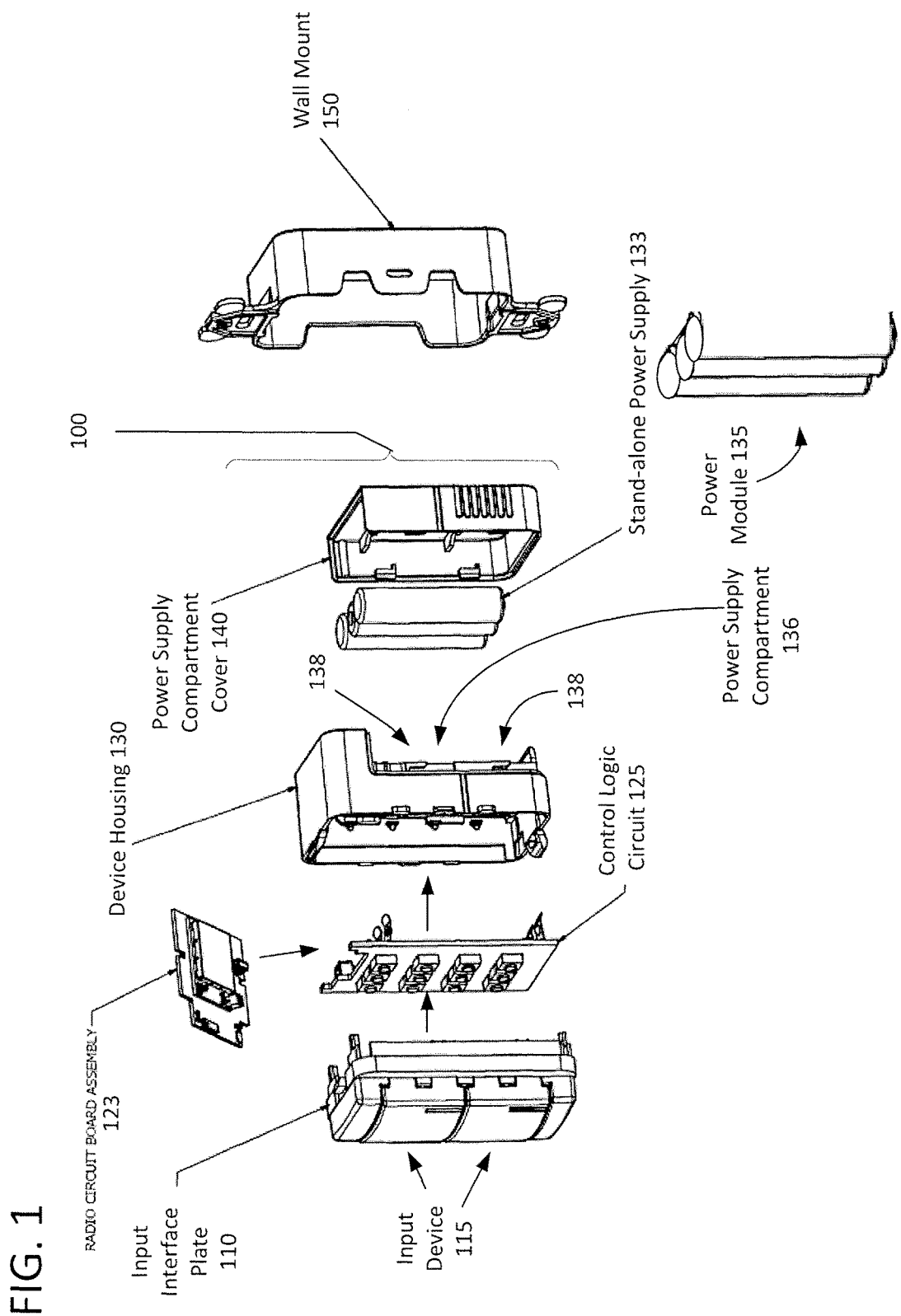
FIG. 1 is an exploded view of an example of a building surface-mounted device, e.g. a wall switch, utilizing a replaceable power supply module as will be described with reference to the examples of FIGS. 2-4.

FIG. 1 is an exploded view of an example of a building surface-mounted device utilizing a replaceable power supply module as will be described with reference to the examples of FIGS. 2-4.

The device 100 may be configured as a wireless input device. The device 100 may be mounted to a surface of an occupiable space in a building, such as a wall, a floor or a ceiling in a room, office, cafeteria, or other space in the building that may be occupied. The device 100 in the illustrated example is configured as a wall switch that turns another device, such as a luminaire ON or OFF, as a ceiling mounted room occupancy sensor, or the like. The line powered adapter concept, however, may be utilized in other types electronic devices configured to draw power from internal batteries and be mounted to a wall or other architectural panel of a building. Examples of other electronic devices that may benefit from the adapter concept include a room occupancy sensor that turns ON or OFF another device, such as an outlet or luminaire; an ambient light sensor to facilitate adjustment of the brightness of light being output by a luminaire; a thermostat, or the like. The device 100 may include a number of components, if included in the device 100, that perform substantially the same functions regardless of the configuration and/or purpose of the device 100. For example, the included components may be found in other types of electronic devices that may be used with a line powered adapter of the type discussed later with reference to FIGS. 2-4. The components of device 100 include a device housing 130, a input interface plate 110, a radio circuit board assembly 123, a power supply compartment 136, and a power supply compartment cover 140.

The device 100 also includes configuration dependent components such as control logic circuits 125 and a type of power supply: a stand-alone power supply 133 or a power module 135. The type of power supply provided for a given installation the device 100, that is to say the stand-alone power supply 133 or a power module 135, likely depends upon the installation environment and the availability of building wiring.

The device 100 may accept inputs from an occupiable space of a building in which the device is installed, for example, via the input interface plate 110. The input interface plate 110 may be configured to include one or more input devices 115 that receive inputs to the device 100. The input device 115 may be a push button, a motion detector, a photodetector, a spectrometer, a rheostat, a toggle switch, or the like. The input device 115 delivers an indication of the received input to a control logic circuit 125. As mentioned, some components may perform substantially the same function regardless of the purpose of the device within the system. For example, the device housing 130 is configured to be mounted on a building wall (shown in other examples). The device housing 130 and the input interface plate 110 are configured to maintain the control logic circuit 125 and the radio circuit board assembly 123 in place within the device 100. For example, both the control logic circuit 125 and the radio circuit board assembly 123 are positioned between the input interface plate 110 and the device housing 130 in the device 100. The positioning of the control logic circuit 125 with respect to the input interface plate 110 allows input device 115 to provide a received input indication to the control logic circuit 125 for further processing. The input interface plate 110 and the device housing 130 are configured to couple to one another via, for example, snap fit connection that snap together or otherwise securely connecting to one another. Built within the side opposite to which the input interface plate 110 couples to the device housing 130 is the power supply compartment 136.

The power supply compartment 136 is configured to hold the stand-alone power supply 133. The stand-alone power supply 133 has a first form factor, e.g. that of one or more standard batteries. The power module 135 has a second form factor that replicates the first form factor of the removable stand-alone power source 133, the power module 135 is configured to fit in the interior space of the power supply compartment 136 when the removable power supply 135 is removed. As a result of this configuration/form factor of the power module 135 the power supply compartment 136 is capable of holding the power module 135 in essentially the same manner that the compartment 136 holds the stand-alone power supply 133.

The device housing 130 may be configured with attachment points 138 around the opening of the power supply compartment 136 that permit attachment of a power supply compartment cover 140. For example, the power supply compartment cover 140 is configured to couple to the device housing 130 in a manner to enclose the power supply compartment 136. The power supply compartment cover 140 may protect the internal components of the device 100 from the environment, such as dust or the like.

In an example, the device 100 may be ready for installation on a surface, such as a wall, of a building when the input interface plate 100 is coupled to the device housing, the control logic circuit 125 and the radio circuit board assembly 123 are in place, the stand-alone power supply 133 is inserted in the power supply compartment 136, and the power supply compartment cover 140 is coupled to the device housing 130.

To complete installation of the device 100 on or within the wall, the wall mount 150 in the example may be inserted through the wall surface (not shown), such as drywall, cement board or the like, and directly or indirectly mounted to the wall surface. The device 100 fits through the wall mount 150 and is securely held within the wall mount 150 by clips, snap-tight fittings, compression fittings, pressure fittings, or the like.

Alternatively, when power module 135 (which is described in more detail with reference to other examples) is inserted in the power supply compartment 136, external building wiring (not shown in this example) is coupled to the power module 135. When installed, the external building wiring may pass through the wall mount 150 for connection to the power module 135.

Additional configuration examples and operational examples will be described with reference to the FIGS. 2 and 3. FIG. 2 is a functional block diagram of an example of a building surface-mounted device having a replaceable power supply module. The installation environment for the device 200 may typically be a wall 202 or ceiling (not shown) of an occupiable space 20. The wall or ceiling may have an interior 25 that has building alternating current (AC) electrical power supply, such as building VAC 270, and associated wiring 272 and 273. The device 200 may, for example, replace an existing conventional wall switch or sensor, where conventional means connected to the building AC electrical power supply. Alternatively, the device 200 may be used in a new installation or renovation of an occupiable space, such as 20.

A wall mount 205 is secured to the wall 202 to facilitate mounting of the device 200 in the wall 202. Upon installation, a portion of the device 202 protrudes into the interior 25 of the wall and the input interface plate 210 of the device 200 protrudes from the building wall 202 into the occupiable space 20 of the building. The device 200 illustrated in FIG. 2 includes similar components as device 100 of FIG. 1. In FIG. 2, for example, the illustrated device shows the input interface plate 210 coupled to the device housing 220 and coupled to the wall mount 205.

The input interface plate 210 is configured to accept or receive an input from within the occupiable space 20 of the building. The input interface plate 210 may also have indicator light emitting diodes (LEDs) that provide an indication light visible in the occupiable space 20. The accepted or received inputs may be tactile inputs, such as a button press or actuation of a switch mechanism, a sensor input, such as from an ambient light detector, a room occupancy detector, a radio frequency identification detection, a humidity detector, a thermostat temperature, a spectrometric input, or the like. The input interface plate 210 may include one or more input devices that perform the same functions, such as turn different luminaires ON and OFF, or provide control inputs for other devices. Alternatively, the input interface plate 210 may include a combination of different input devices that provide different types of inputs to the control circuit 221. For example, the control circuit 221 may be configured to receive an accepted input from the input interface plate 210. In response to the accepted input, the control circuit 221 may initiate a function based on a configuration of the control logic circuit 221. The device housing 220 is configured to secure the control logic circuits 221 in the control device 200.

Depending upon the different input devices and the different functions, a control logic circuit 221 having a predetermined electrical power supply requirement is provided within the device housing 220. The device housing 220 also includes a radio transceiver (xcvr) 223 that is coupled to the control circuit 221.

The device housing 220 also includes a power supply compartment 227 that includes power supply terminals 225 from which the control circuit 221, the radio transceiver 223 and/or the input interface plate 210 receive electrical power meeting their respective specifications.

The device 200 may be a wall-mountable device that is supplied with electrical power either by a stand-alone power source 230 (shown as Option A) or a power module 250 (shown as Option B). A power supply compartment 227 is formed within the device housing 220. The power supply compartment 227 has an interior space shaped to accept, for example, either the removable stand-alone power source 230 according to Option A or the power module 250 according to Option B.

The power module 250 may include, for example, a power module housing 251, connection points 255, an electrical power conversion circuit 253, and power module contacts 257a and 257b. The power module housing 251 provides the structure in which the connection points 255, the electrical power conversion circuit 253, the power module contacts 257a and 257b, and other structures and wiring are contained and physically supported. The connection points 255 couple to wiring 272, 273 from a building's electrical power supply, such as building VAC 270. The electrical power conversion circuit 253 converts the building AC electrical power to the predetermined DC electrical power supply required of the control logic circuit 221, radio transceiver 223 and/or any other miscellaneous circuits, such as indicator lights or the like. The power module contacts 257a, 257b electrically couple to respective power supply terminals 225 of the power supply compartment 227 to deliver electrical power meeting the predetermined electrical power supply requirement (e.g., 3.4-6.6 DC volts) of the components of the device housing 220, such as the control logic circuit 221, radio transceiver 223 or miscellaneous circuits.

The power supply compartment 227 includes power supply terminals 225 accessible at the interior space of the power supply compartment 227. The power supply terminals 225 are configured to mate to either the terminals 237a, 237b of the stand-alone power source 230 or the terminals 257a, 257b of the power module 250. When the power supply terminals 257a and 257b to deliver direct current electrical power to the device housing 220 and to the control logic circuit 221, the radio transceiver 223 and/or the input interface plate 210.

Regardless of whether power supply Option A or Option B is chosen, the interior space of the power supply compartment 227 is configured to secure the removable stand-alone power source 230 (Option A) or the power module 250 (Option B) within the power supply compartment 227.

The stand-alone power source 230 has a first form factor. For example, the stand-alone power source 230 is one or more batteries, such as batteries sized as AA, AAA, C D, 9V, "coin"-shaped specialty batteries or the like. In addition, the composition of the stand-alone power supply 230 may be alkaline, lithium, nickel metal hydride (NiMH), silver oxide or the like. The stand-alone power source 230 provides the electrical power required to operate the control and communication functions of the control circuit 221 and radio transceiver 223 (described in more detail with reference to FIG. 4) as well as any miscellaneous circuits, such as indicator lights or the like. The one or more batteries of the stand-alone power supply 230 may have a shape that conforms to the dimensions of the power supply compartment 227.

For example, the space between the power supply terminals 225 may have such close tolerances that the stand-alone power source 230 may compress the power supply terminals 225, which provides sufficient pressure to hold the stand-alone power source 230 in place or the power module 250. Alternatively or in addition, the walls of the power supply compartment 227 may be, for example, curved, tabbed, covered with a tacky material or coating, or otherwise configured to retain the stand-alone power source 230 or the power module 250. Alternatively, the dimensions of the power supply compartment 227 may be such that the stand-alone power source 230 or the power module 250.

In Option B, the power module 250 is used in place of the stand-alone power source 230. For example, the power module 250 may have a second form factor that replicates the first form factor of the removable stand-alone power source 230. The power module 250 is configured to fit in the interior space of the power supply compartment 227 when replacing the removable stand-alone power source 230. The power module 250 may include, for example, connection points 255, an electrical power conversion circuit 253, and power module contacts 257a and 257b. The connection points 255 couple to wiring 272, 273 from a building's electrical power supply, such as building VAC 270. The electrical power conversion circuit 253 converts the building AC electrical power to the predetermined DC electrical power supply required of the control logic circuit 221, radio transceiver 223 and/or any other miscellaneous circuits, such as indicator lights or the like. The power module contacts 257a, 257b electrically couple to respective power supply terminals 225 of the power supply compartment 227 to deliver electrical power meeting the predetermined electrical power supply requirement (e.g., 3.4-6.6 DC volts) of the components of the device housing 220, such as the control logic circuit 221, radio transceiver 223 and/or miscellaneous circuits.

The cover 260 includes punch-out areas 263. The punch-out areas 263 may be scored areas in the cover 260. If Option A is used for supplying power to the device 200, the punch-out areas 263 remain intact on the cover 260. Conversely, if Option B is used to power the device 200, the punch-out areas 263 are removed, or "punched-out," and what remains after the removal of the punch-out areas 263 are holes 264. The cover 260' with holes 264 is configured to cooperate with power module 250 and building VAC wiring 272 and 273, which pass through the cover 260' and connect to the connection points 255.

In the Option B configuration, the building VAC wiring 272 and 273 pass through respective holes 264 in the cover 260' and is connected at connection points 255 to the device 200. The connection points 255 are coupled to the electrical power conversion circuit 253. The power conversion circuit 253 is configured to provide electrical conversion functions, such as AC-to-DC conversion, over voltage protection and the like. The DC electrical power provided by the power conversion circuit 253 of the power module 250 is applied via power module contacts 257a and 257b to the power supply terminals 225 of the power supply compartment 227 and passed to the device housing 220 for use by the control logic circuit 221, radio transceiver 223 and/or miscellaneous circuits.

Regardless of whether Option A or Option B is selected, the power supply compartment cover 260 and 260' enclose the power supply compartment 227. The power supply compartment cover s 260 and 260' are further configured to couple to the device housing 220.

Figure 2:
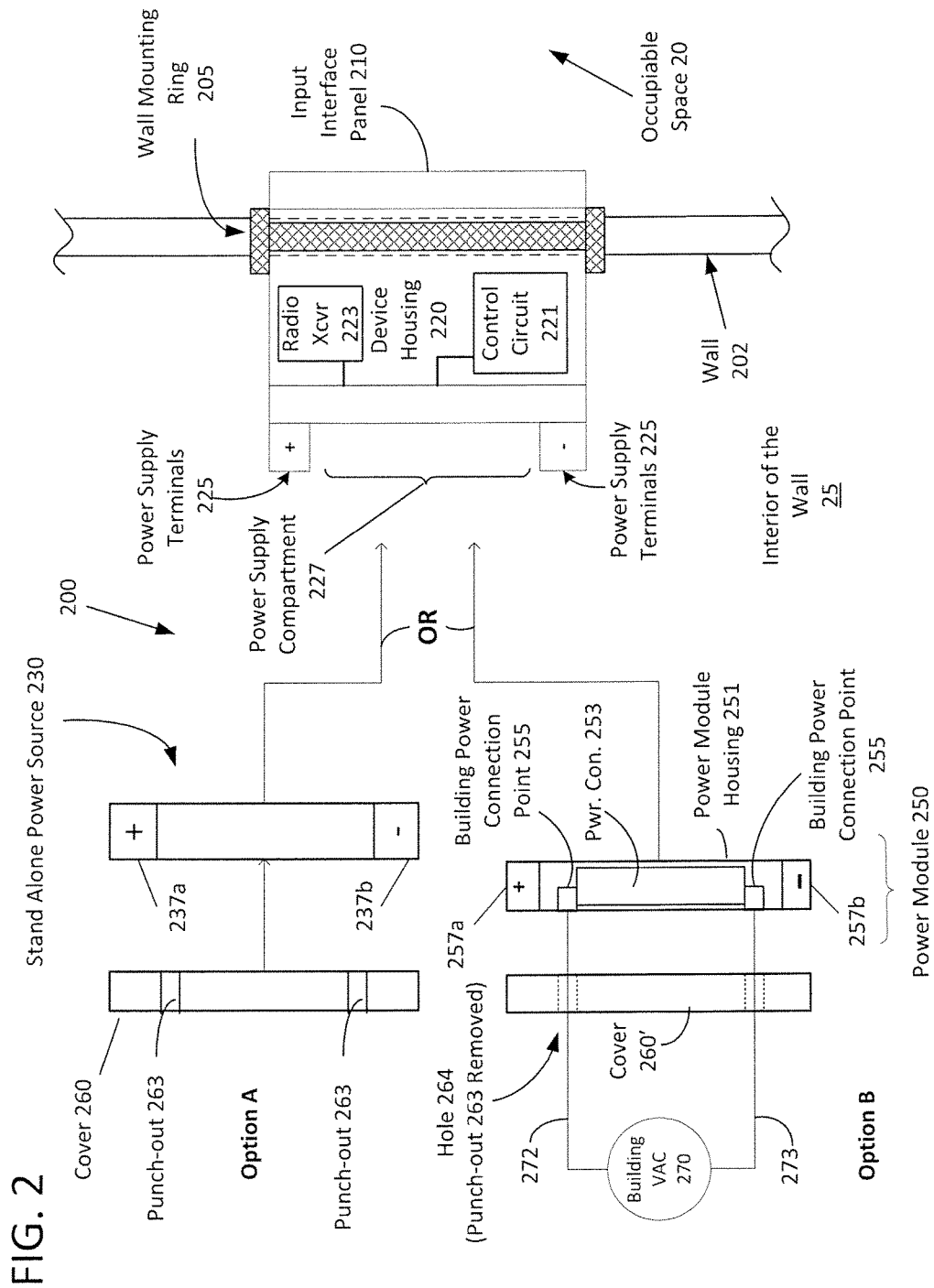
FIG. 2 is a functional block diagram of an example of a building surface-mounted device having a replaceable power supply module.
Figure 3:
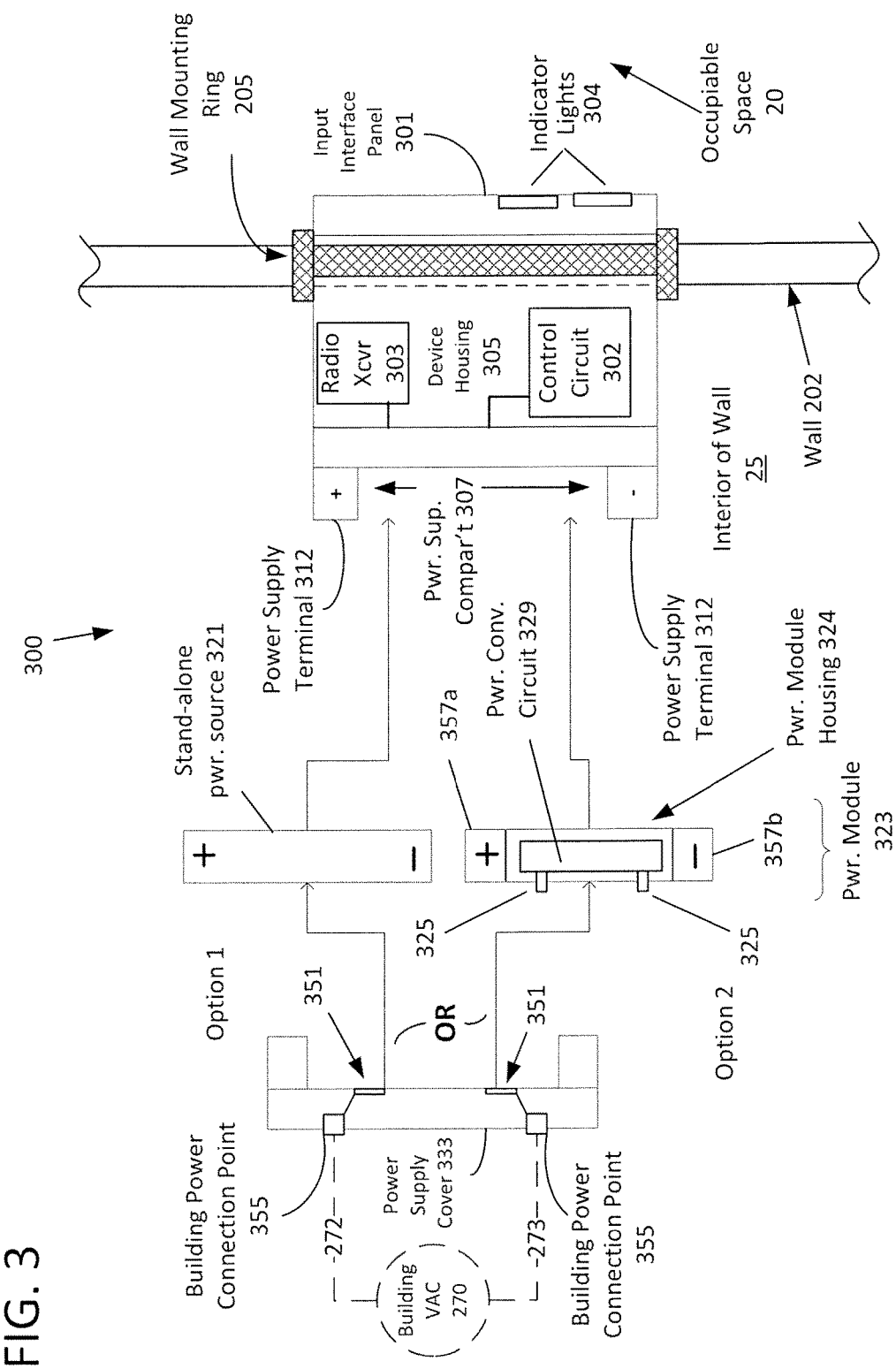
FIG. 3 is a functional block diagram of another example of a building surface-mounted device having a replaceable power supply module.

FIG. 3 is a functional block diagram of another example of a building surface-mounted device, such as a wall switch, having a replaceable power supply module. The device 300 is configured such that the input interface plate 301 protrudes into the occupiable space 20, and the power supply cover 333, the connection points 355, the conversion circuit 329 within the removable power module 323 are positioned within the interior space 25 of the wall 202 behind the input interface plate 301 that protrudes into the building's occupiable space 20. In the example illustrated in FIG. 3, the building surface-mounted device 300 has two different options for being supplied with electrical power. The device 300 may be powered either as shown in Option 1 by the stand-alone power source 321, or as shown in Option 2 by using the power module 323 that is connected to the building VAC 270 via building wiring 272, 273. In the example of FIG. 3, the device 300 utilizes a different configuration for a power module 323 and cover 333 as compared to the power module 250 and cover 260/260' of the FIG. 2 example.

Otherwise, the device 300 in FIG. 3 is similar to the device 200 of FIG. 2 with regard to the functional aspects and features of the receiving of control inputs, processing the inputs via control logic circuits, the radio transceiver, and the like between the device housing 305 and the input interface plate 301. The structural aspects and features of device housing 305, input interface plate 301 and the wall mount 205 are substantially the same as the similar features in FIG. 2. For example, the device housing 305 may be mounted on a wall 202 of an occupiable building space 20. The device 300 is retained on the wall 202 by a wall mount 205. In addition, similar to device 200, the device 300 includes a device housing 305 and an input interface plate 301.

The device housing 305 includes a power supply compartment 307 that includes power supply terminals 312. The power supply terminals 312 are positioned within the power supply compartment 307, and couple to the control circuit 302, the radio transceiver 303 and miscellaneous circuits, such as indicator lights 304, via electrical paths to deliver direct current (DC) electrical power.

When positioned within the power supply compartment 307, the power supply terminals 312 mate with terminals (+, –) of the stand-alone power source 321. The power supply compartment 307, for example, has a shape conforming to a shape of a stand-alone power source 321. In Option 1, the stand-alone power source 321 may be one or more power sources, such as AAA, AA or similar batteries, that are capable of supplying direct current electrical power required for operation of the device 300. Since electrical power is provided by the stand-alone power source 321 and not by the building VAC 270 in the Option 1 configuration, the building VAC wiring 272, 273 are not coupled to the power supply cover 333.

While the previous discussion of the example of FIG. 3 was similar to the discussion of similar elements in FIG. 2, the following discussion of Option 2 includes the details of the power module 323 and the power supply cover 333 of the device 300 of FIG. 3 that differ from those described with reference to device 200 of FIG. 2.

The shape of the removable power module 323 replicates the shape of the stand-alone power source 321. As such, the removable power module 323 is configured to be inserted into and be removed from the power supply compartment 307.

In more detail, the removable power module 323 includes a power module housing 324, a power conversion circuit 329, power module contacts 357a, 357b, and external power terminals 325. The power module housing 324 provides the structure in which the power conversion circuit 329, the power module contacts 357a, 357b, the external power terminals 325, and other structures and wiring are contained and physically supported. In Option 2, the external power terminals 325 are coupled to an external alternating current power supply, such as building VAC 270. The external power terminals are coupled to the electrical power conversion circuit 329. The electrical power conversion circuit 329 includes, for example, circuitry, such as a transformer, a rectifier circuit and/or the like, that converts the alternating current electrical power supplied by the building VAC 270 into direct current electrical power usable by circuits in the device housing 305, such as control circuit 302, radio transceiver 303 and any miscellaneous circuits, such as LED pilot or indicator lights 304. The direct current electrical power is output from the power conversion circuit 329 via power module contacts 357a, 357b. The power module contacts 357a, 357b mate with the power supply terminals 312 of the power supply compartment 307.

The external power terminals 325 of the power module 323 couple with the terminals 351 within the power supply cover 333. The terminals 351 are connected to building power connection points 355. The building power connection points 355 may be screw terminals, compress fittings, wire push-in terminals, or the like. The external building power connection points 355 of the power supply cover 333 couple directly to a building's alternating current electrical power supply such as building VAC wiring 272, 273 within the interior wall 25 of the occupiable building space. A benefit of the removable power module 323 coupled to the building's alternating current electrical power supply 270 is that the removable power module 323 provides direct current power to the power supply terminals 312 of the device 300 that does not degrade over time as compared to a stand-alone power source, such as 321.

The power supply cover 333 couples to the device housing 305 at a location opposite to a location at which the control interface 301 couples to the control device housing 305.

Figure 4:
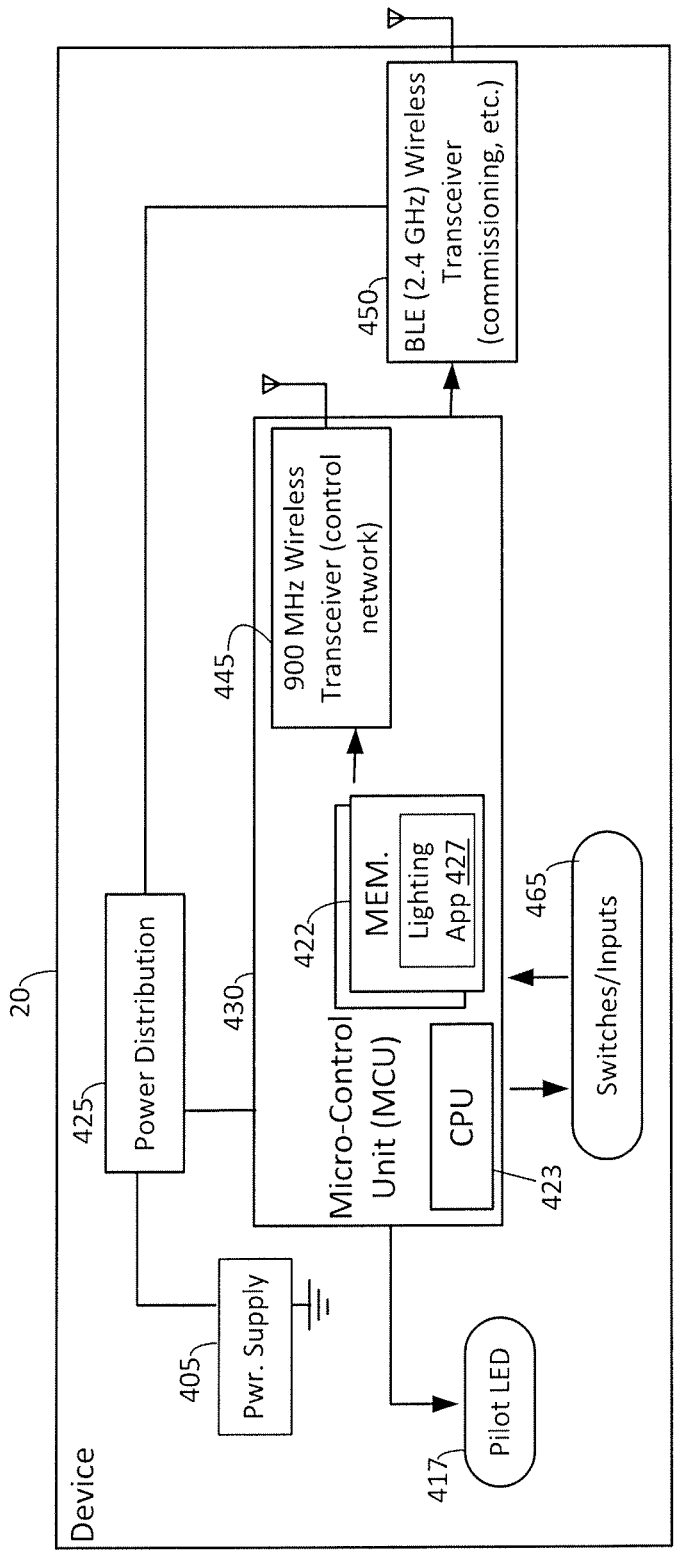
FIG. 4 is a block diagram of a building surface-mounted device, e.g. a wall switch, that communicates with a lighting control system.

FIG. 4 is a block diagram of a building surface-mounted device that communicates with a lighting control system. Device 20 may be, for example, a surface-mounted device, for example, a wall switch, that is a singularly addressable device that can be configured to operate as a member of one or more lighting control groups or zones. The circuitry, hardware, and software of device 20 enables the device 20 to operate as a wireless control device. As shown, the device 20 receives electrical power from a power supply 405. The power supply 405 may be a stand-alone power supply, such as 230 or 321, or may receive building VAC power using a power module, such as 250 or 323. Device 20 furthers include a light emitting diode(s) (LED) pilot, or indicator, lights 417. The pilot LEDs 417 may indicate, for example, the state of the device 20, for example, during operation, a commissioning and maintenance process, or the like.

As shown, an MCU 430 includes a memory 422 (volatile and non-volatile) and a central processing unit (CPU) 423. The memory 422 includes a lighting application 427 (which can be firmware) for lighting control operations and/or commissioning/maintenance operations. The power distribution circuitry 425 distributes power and ground voltages obtained from the power supply 405 to the MCU 430, wireless transceivers 445 and 450, and switches 465 to provide reliable operation of the various circuitry on the device 20.

Device 20 also includes a dual-band wireless radio communication interface system configured for two way wireless communication. In the example, device 20 has a radio set, such as radio transceiver 223 of FIG. 2 or 303 of FIG. 3. The radio transceiver 223 or 303 may include a radio transceiver 445 for sub-GHz communications and another radio 450 for Bluetooth RF communication. A first transceiver 445, such as a 900 MHz wireless transceiver, issues control operations on the lighting control network. This first transceiver 445 is for any-to-many communication, over a first of the two different wireless communication bands, of control and systems operations information, during luminaire operation and during control network operation over the first wireless communication band.

A second transceiver 450, such as a 2.4 GHz BLE (Bluetooth) wireless transceiver carries out commissioning and maintenance of the lighting control network. This second transceiver 450 is for point-to-point communication, over a second of the two different wireless communication bands, of information other than the control and systems operations information, concurrently with at least some communications over the first wireless communication band.

As shown, the MCU 430 includes programming in the memory 422 which configures the CPU (processor) 423 to control operations of the respective device 20, including the communications over the two different wireless communication bands via the dual-band wireless radio communication interface system 445, 450. The programming in the memory 422 includes a real-time operating system (RTOS) and further includes a lighting application 427 which is firmware/software that engages in communications with a network (not shown). The lighting application 427 programming in the memory 422 carries out lighting control operations over, for example, a lighting control network (not shown). The RTOS supports multiple concurrent processing threads for different simultaneous control or communication operations of the device 20.

In FIG. 4, in addition to the memory 422 and the CPU 423 of the MCU 430 itself, the first transceiver 445 and the second transceiver 450 each include a separate memory (not shown) and a processor (not shown). Hence, in the example of FIG. 4, the MCU 430, first transceiver 445, and second transceiver 450 combine to include a total of three processors and three sets of memory.

As shown, device 20 includes switches/inputs 465, such as a dimmer switch, or occupancy sensor set scene switch that may be included in the input interface plate 210 of device 200 and 301 of device 300. Switches 465 can be or include sensors, such as infrared sensors for occupancy or motion detection, an in-fixture daylight sensor, an audio sensor, a temperature sensor, or other environmental sensor. Switches 465 may be based on Acuity Brands Lighting's commercially available xPoint® Wireless ES7 product.

In an operational example, a device, such as device 20, may be configured to receive inputs via switches/inputs 465 that are processed by the CPU 423 executing instructions stored in the memory 422, such as lighting application software 427. In response to the received inputs, the CPU 423 outputs signals that are transmitted by a radio transceiver, such as dual-band wireless radio communication interface system 445, 450, in the form of a signal, for example, a control operation signal on a lighting control network.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A device, comprising:
a housing configured to be mounted on a surface of an occupiable space in a building;
an input interface plate coupled to the housing;
a control logic circuit, within the housing, responsive to an input via the interface panel and having a predetermined electrical power supply requirement;
a power supply compartment within the housing having an interior space shaped to accept a removable stand-alone power source having a first form factor, wherein the interior space is configured to secure the removable stand-alone power source within the power supply compartment;
power supply terminals accessible at the interior space of the power supply compartment, the power supply terminals configured to mate with power output contacts of the removable power source to deliver direct current electrical power to the control logic circuit; and
a power module having a second form factor that replicates the first form factor of the removable stand-alone power source, wherein the power module is configured to fit in the interior space of the power supply compartment when the removable power supply is removed, the power module comprising:
connection points for coupling to a building's electrical power supply wiring;
an electrical power conversion circuit configured to convert the building electrical power received via the connection points to the predetermined electrical power supply requirement of the control logic circuit; and
power module contacts configured to electrically couple an output from the electrical power conversion circuit to the power supply terminals, to deliver the electrical power meeting the predetermined electrical power supply requirement to the control logic circuit.

2. The device of claim 1, wherein the input interface plate is configured to:
protrude from the building wall into an occupiable space of a building, and
accept an input within the occupiable space.

3. The device of claim 1, wherein the input interface plate is configured to:
protrude from the wall into the occupiable building space, and
provide inputs to the control circuit.

4. The device of claim 1, wherein the electrical power conversion circuit comprises:
circuitry that converts alternating current electrical power supplied by the building into direct current power usable by the control circuit.

5. The device of claim 1, further comprising:
a power supply compartment cover configured to couple to the device housing in a manner to enclose the power supply compartment;
the power supply compartment cover having a removable punch-out area that when removed enable wiring of the building's electrical power supply access to the power module connection points.

6. The device of claim 1, further comprising:
a radio transceiver coupled to the control logic circuit, wherein the radio transceiver is configured to in response to signals from the control logic circuit, output signals on a lighting control network.

7. A device, comprising:
a control device housing configured to be mounted on a surface of an occupiable building space, the control device housing including:
a control circuit responsive to an input;
a power supply compartment having a shape that conforms to a shape of a stand-alone power source; and
power supply terminals positioned within the power supply compartment and coupled to the control circuit;
an input interface plate coupled to the control device housing; and
a removable power module shaped to replicate the shape of the stand-alone power source, the removable power module configured for removable insertion into the power supply compartment when the stand-alone power source is removed from the power supply compartment, the removable power module comprising:
connection points that couple directly to a building's alternating current electrical power supply on the surface of the occupiable building space;

an electrical power conversion circuit to convert the building electrical power to the direct current electrical power; and power delivery terminals that mate with the power supply terminals positioned within the power supply compartment to deliver the direct current electrical power to the control circuit.

8. The device of claim 7, wherein the input interface plate is configured to:

protrude from the surface into the occupiable building space, and provide inputs to the control circuit.

9. The device of claim 7, wherein the electrical power conversion circuit comprises:

circuitry that converts alternating current electrical power supplied by the building into direct current power usable by the control circuit.

10. The device of claim 7, further comprising:

a power supply compartment cover that couples to the control device housing at a location opposite to a location at which the input interface plate couples to the control device housing.

11. The device of claim 7, wherein the device is retained on the wall by a wall mount.

12. The device of claim 7, wherein the removable power module when coupled to the building's alternating current electrical power supply provides direct current power that does not degrade over time to the power supply terminals.

13. The device of claim 7, wherein the control device housing is configured such that the connection points, the conversion circuit, and the removable power module are positioned on the wall of an occupiable building space behind the input interface plate.

14. The device of claim 7, wherein walls of the power supply compartment are curved, tabbed, or covered with a tacky material to retain the power module.

15. The device of claim 7, further comprising:

a radio transceiver coupled to the control logic circuit, wherein the radio transceiver is configured to in response to signals from the control logic circuit, output signals on a lighting control network.

16. An apparatus, comprising:

a power module housing insertable into a power supply compartment of a control device mountable through a surface of an occupiable space;

connection points electrically connectable to wiring behind the surface;

an electrical power conversion circuit disposed within the power module housing and electrically coupled to the connection points, the conversion circuit configured to convert alternating current electrical power received via the connection points to a predetermined direct current electrical power; and power module contacts to deliver the direct current electrical power to a device electrically coupled to power supply terminals to deliver the predetermined direct current electrical power to the control device, wherein the power module housing is configured to:

replicate a form factor of the power supply compartment that accepts removable stand-alone power sources, and fit in the interior space of a power supply compartment.

17. The apparatus of claim 16, wherein the connection points are accessible through an exterior surface of the power module housing.

18. The apparatus of claim 16, wherein the connection points are configured to couple to alternating current electrical power supply wiring of a building.

* * * * *